United States Patent
Litz et al.

(10) Patent No.: US 10,246,647 B2
(45) Date of Patent: Apr. 2, 2019

(54) ADSORBENTS AND METHODS OF USE

(71) Applicants: AUTERRA, INC., Schenectady, NY (US); CENOVUS ENERGY INC., Calgary (CA)

(72) Inventors: Kyle E. Litz, Ballston Spa, NY (US); Jonathan P. Rankin, Galway, NY (US); Erica H. Shipley, Scotia, NY (US); Michael Scudder, Scotia, NY (US); Trent A. McCaskill, Mechanicville, NY (US)

(73) Assignees: AUTERRA, INC., Schenectady, NY (US); CENOVUS ENERGY INC., Calgary (CA)

( * ) Notice: Subject to any disclaimer, the term of this patent is extended or adjusted under 35 U.S.C. 154(b) by 175 days.

(21) Appl. No.: 15/080,784

(22) Filed: Mar. 25, 2016

(65) Prior Publication Data
US 2016/0281003 A1 Sep. 29, 2016

Related U.S. Application Data

(60) Provisional application No. 62/138,475, filed on Mar. 26, 2015.

(51) Int. Cl.
| | | |
|---|---|---|
| C10G 25/00 | (2006.01) | |
| C10G 25/12 | (2006.01) | |
| B01J 20/02 | (2006.01) | |

(52) U.S. Cl.
CPC ......... *C10G 25/003* (2013.01); *B01J 20/0211* (2013.01); *C10G 25/12* (2013.01)

(58) Field of Classification Search
CPC ..... C10G 25/003; C10G 25/12; B01J 20/0211
See application file for complete search history.

(56) References Cited

U.S. PATENT DOCUMENTS

| | | |
|---|---|---|
| 1,796,621 A | 3/1931 | Ramage |
| 2,110,283 A | 3/1938 | Archibald |

(Continued)

FOREIGN PATENT DOCUMENTS

| | | |
|---|---|---|
| FR | 82735 A | 4/1938 |
| FR | 1299736 A | 7/1962 |

(Continued)

OTHER PUBLICATIONS

Jain, Suman L., et al. Rehenium-Catalyzed Highly Efficient Oxidations of Tertiary Nitrogen Compounds to N-Oxides Using Sodium Percarbonate as Oxygen Source. Synlett, 2006, No. 16, pp. 2661-2663. Published on Web Sep. 22, 2006 (Doc 1).

(Continued)

*Primary Examiner* — Randy Boyer
*Assistant Examiner* — Juan C Valencia
(74) *Attorney, Agent, or Firm* — Schmeiser, Olsen & Watts, LLP

(57) ABSTRACT

Systems, methods and compositions for reducing the heteroatom content of hydrocarbon feed using transition metal complexes and adsorption techniques. The transition metal complexes include titanyl, hafnyl and zirconyl complexes activated using one or more hydroperoxides or peracids. The activated adsorbents are incorporated into one or more vessels as an adsorption bed for adsorbing the heteroatoms present in hydrocarbon feeds. The systems, methods and compositions separate the heteroatoms passed through the system by contacting the adsorption compositions with the heteroatoms of the hydrocarbon feed, adsorbing the heteroatom to the adsorption material, further allowing for the retrieval of a hydrocarbon product having a reduced heteroatom content.

9 Claims, 6 Drawing Sheets

(56) References Cited

U.S. PATENT DOCUMENTS

| | | |
|---|---|---|
| 2,764,525 A | 9/1956 | Porter et al. |
| 2,771,402 A | 11/1956 | Birch et al. |
| 2,789,134 A | 4/1957 | Nelson et al. |
| 2,794,770 A | 6/1957 | Alderson et al. |
| 2,910,434 A | 10/1959 | Hess et al. |
| 2,987,470 A | 6/1961 | Turken |
| 3,136,714 A | 6/1964 | Gibson et al. |
| 3,164,545 A | 1/1965 | Mattox |
| 3,505,210 A | 4/1970 | Wallace et al. |
| 3,558,747 A | 1/1971 | Meltsner |
| 3,565,793 A | 2/1971 | Herbstman et al. |
| 3,668,117 A | 6/1972 | Patel et al. |
| 3,819,509 A | 6/1974 | Wolk et al. |
| 3,847,797 A | 11/1974 | Pasternak et al. |
| 3,945,914 A | 3/1976 | Yoo et al. |
| 3,948,759 A | 4/1976 | King et al. |
| 3,957,620 A | 5/1976 | Fukui et al. |
| 3,960,706 A | 6/1976 | McCollum |
| 3,960,708 A | 6/1976 | McCollum |
| 3,964,995 A | 6/1976 | Wolk et al. |
| 4,003,823 A | 1/1977 | Baird, Jr. et al. |
| 4,119,528 A | 10/1978 | Baird, Jr. et al. |
| 4,127,470 A | 11/1978 | Baird, Jr. et al. |
| 4,192,736 A | 3/1980 | Kluksdahl |
| 4,224,140 A | 9/1980 | Fujimori et al. |
| 4,374,949 A | 2/1983 | Massey et al. |
| 4,437,980 A | 3/1984 | Heredy et al. |
| 4,444,655 A | 4/1984 | Shiroto et al. |
| 4,591,426 A | 5/1986 | Krasuk et al. |
| 4,645,589 A | 2/1987 | Krambeck et al. |
| 4,665,261 A | 5/1987 | Mazurek |
| 4,923,682 A | 5/1990 | Roberts |
| 5,064,523 A | 11/1991 | Kretschmar et al. |
| 5,089,149 A | 2/1992 | Ridland et al. |
| 5,166,118 A | 11/1992 | Kretschmar et al. |
| 5,288,681 A | 2/1994 | Gatsis |
| 5,616,751 A | 4/1997 | Takeshi et al. |
| 5,637,739 A | 6/1997 | Jacobsen et al. |
| 6,087,662 A | 7/2000 | Litz et al. |
| 6,160,193 A | 12/2000 | Gore |
| 6,245,223 B1 | 6/2001 | Gorbaty et al. |
| 6,342,191 B1 | 1/2002 | Kepner et al. |
| 6,368,495 B1 | 4/2002 | Kocal et al. |
| 6,403,526 B1 | 6/2002 | Lussier et al. |
| 6,406,616 B1 | 6/2002 | Rappas et al. |
| 6,471,852 B1 | 10/2002 | Mark et al. |
| 6,544,409 B2 | 4/2003 | DeSouza |
| 6,547,957 B1 | 4/2003 | Sudhakar et al. |
| 6,579,472 B2 | 6/2003 | Chung et al. |
| 6,673,236 B2 | 1/2004 | Stanciulescu et al. |
| 6,846,406 B2 | 1/2005 | Canos et al. |
| 7,144,499 B2 | 12/2006 | Han et al. |
| 7,153,414 B2 | 12/2006 | DeSouza |
| 7,179,368 B2 | 2/2007 | Rabion et al. |
| 7,314,545 B2 | 1/2008 | Karas et al. |
| 7,371,318 B2 | 5/2008 | Corma Canos et al. |
| 7,374,666 B2 | 5/2008 | Wachs |
| 7,598,426 B2 | 10/2009 | Fang et al. |
| 7,648,625 B2 | 1/2010 | Bhan et al. |
| 7,678,264 B2 | 3/2010 | Bhan |
| 7,749,374 B2 | 7/2010 | Bhan et al. |
| 7,790,021 B2 | 9/2010 | Kocal et al. |
| 7,794,843 B2 | 9/2010 | Yamane et al. |
| 7,875,185 B2 | 1/2011 | Zhang |
| 7,919,992 B2 | 4/2011 | Bhan |
| 8,088,706 B2 | 1/2012 | Domokos et al. |
| 8,187,991 B2 | 5/2012 | Osaheni et al. |
| 8,197,671 B2 | 6/2012 | Rankin et al. |
| 8,241,490 B2 | 8/2012 | Litz et al. |
| 8,283,498 B2 | 10/2012 | Litz et al. |
| 8,298,404 B2 | 10/2012 | Litz et al. |
| 8,372,777 B2 | 2/2013 | Bhan et al. |
| 8,394,261 B2 | 3/2013 | Litz et al. |
| 8,409,541 B2 | 4/2013 | Reynolds et al. |
| 8,444,061 B2 | 5/2013 | Van Den Berg et al. |
| 8,450,538 B2 | 5/2013 | Bhan et al. |
| 8,481,450 B2 | 7/2013 | Bhan |
| 8,492,599 B2 | 7/2013 | Bhan et al. |
| 8,530,370 B2 | 9/2013 | Donaho |
| 8,562,817 B2 | 10/2013 | Milam et al. |
| 8,562,818 B2 | 10/2013 | Milam et al. |
| 8,597,608 B2 | 12/2013 | Reynolds et al. |
| 8,608,946 B2 | 12/2013 | Bhan et al. |
| 8,764,973 B2 | 7/2014 | Litz et al. |
| 8,877,013 B2 | 11/2014 | Litz et al. |
| 8,877,043 B2 | 11/2014 | Litz et al. |
| 8,894,843 B2 | 11/2014 | Rankin et al. |
| 8,961,779 B2 | 2/2015 | Litz et al. |
| 9,061,273 B2 | 6/2015 | Litz et al. |
| 9,206,359 B2 | 12/2015 | Litz et al. |
| 9,512,151 B2 | 12/2016 | Litz et al. |
| 9,828,557 B2 | 11/2017 | Rankin et al. |
| 2002/0177522 A1 | 11/2002 | Alexander, IV et al. |
| 2002/0189975 A1 | 12/2002 | DeSouza |
| 2003/0000867 A1 | 1/2003 | Reynolds |
| 2003/0149317 A1 | 8/2003 | Rendina |
| 2004/0108252 A1 | 6/2004 | DeSouza |
| 2004/0178121 A1 | 9/2004 | Leyshon et al. |
| 2004/0178122 A1 | 9/2004 | Karas et al. |
| 2004/0222134 A1 | 11/2004 | DeSouza |
| 2004/0238410 A1 | 12/2004 | Inoue et al. |
| 2005/0014850 A1 | 1/2005 | Hu |
| 2005/0023188 A1 | 2/2005 | Connor |
| 2005/0231457 A1 | 10/2005 | Yamamoto et al. |
| 2006/0011510 A1 | 1/2006 | Toshima et al. |
| 2006/0144793 A1 | 7/2006 | Dadachov |
| 2006/0154814 A1 | 7/2006 | Zanibelli et al. |
| 2006/0180501 A1 | 8/2006 | Da Silva et al. |
| 2006/0231456 A1 | 10/2006 | Bhan |
| 2006/0234876 A1 | 10/2006 | Bhan |
| 2007/0000810 A1 | 1/2007 | Bhan et al. |
| 2007/0051667 A1 | 3/2007 | Martinie et al. |
| 2007/0256980 A1 | 11/2007 | Krogue |
| 2007/0295646 A1 | 12/2007 | Bhan et al. |
| 2008/0083650 A1 | 4/2008 | Bhan et al. |
| 2008/0087575 A1 | 4/2008 | Bhan et al. |
| 2008/0121565 A1 | 5/2008 | Yoo et al. |
| 2008/0135449 A1 | 6/2008 | Bhan et al. |
| 2008/0308463 A1 | 12/2008 | Keckler et al. |
| 2009/0065399 A1 | 3/2009 | Kocal et al. |
| 2009/0188836 A1 | 7/2009 | Bhan et al. |
| 2010/0055005 A1 | 3/2010 | Bhan et al. |
| 2010/0098602 A1 | 4/2010 | Bhan et al. |
| 2011/0000823 A1 | 1/2011 | Hamad et al. |
| 2011/0011771 A1 | 1/2011 | Litz et al. |
| 2011/0031164 A1 | 2/2011 | Litz et al. |
| 2011/0108464 A1 | 5/2011 | Rankin et al. |
| 2011/0119988 A1* | 5/2011 | Litz .................. C07F 7/003 44/300 |
| 2011/0147274 A1 | 6/2011 | Soto |
| 2011/0178346 A1 | 7/2011 | Milam et al. |
| 2011/0178376 A1 | 7/2011 | Milam et al. |
| 2011/0192762 A1 | 8/2011 | Wellington et al. |
| 2011/0210043 A1 | 9/2011 | Wellington et al. |
| 2011/0294657 A1 | 12/2011 | Soled et al. |
| 2012/0055843 A1 | 3/2012 | Bourane et al. |
| 2012/0055844 A1 | 3/2012 | Bourane et al. |
| 2012/0055845 A1 | 3/2012 | Bourane et al. |
| 2012/0055849 A1 | 3/2012 | Bourane et al. |
| 2012/0067777 A1 | 3/2012 | Litz et al. |
| 2012/0074040 A1 | 3/2012 | Koseoglu et al. |
| 2012/0152804 A1 | 6/2012 | Koseoglu et al. |
| 2012/0285864 A1 | 11/2012 | Rankin et al. |
| 2012/0285866 A1 | 11/2012 | Litz et al. |
| 2013/0015104 A1 | 1/2013 | Al-Haji et al. |
| 2013/0026062 A1 | 1/2013 | Al-Shahrani et al. |
| 2013/0026071 A1 | 1/2013 | Koseoglu et al. |
| 2013/0026075 A1 | 1/2013 | Koseoglu et al. |
| 2013/0028822 A1 | 1/2013 | Bourane et al. |
| 2013/0030236 A1 | 1/2013 | Koseoglu et al. |
| 2013/0048543 A1 | 2/2013 | Litz et al. |
| 2013/0075305 A1 | 3/2013 | Al-Shafei et al. |
| 2013/0130892 A1 | 5/2013 | Litz |
| 2013/0171039 A1 | 7/2013 | Graham et al. |

(56) References Cited

U.S. PATENT DOCUMENTS

| | | | |
|---|---|---|---|
| 2013/0185044 | A1 | 7/2013 | Chen et al. |
| 2013/0315793 | A1 | 11/2013 | Koseoglu et al. |
| 2013/0334103 | A1 | 12/2013 | Bourane et al. |
| 2014/0024569 | A1 | 1/2014 | Bera et al. |
| 2014/0131256 | A1 | 5/2014 | Litz et al. |
| 2014/0151305 | A1* | 6/2014 | Schrage .............. B01J 20/04 |
| | | | 210/681 |
| 2014/0216984 | A1 | 8/2014 | Litz et al. |
| 2014/0291199 | A1 | 10/2014 | Litz et al. |
| 2014/0339136 | A1 | 11/2014 | Litz et al. |
| 2015/0184086 | A1 | 7/2015 | Rankin et al. |
| 2015/0337208 | A1 | 11/2015 | Litz et al. |
| 2015/0337220 | A1 | 11/2015 | Litz et al. |
| 2017/0260462 | A1 | 9/2017 | Rankin et al. |

FOREIGN PATENT DOCUMENTS

| | | |
|---|---|---|
| FR | 1472280 A | 3/1967 |
| KR | 100733571 B1 | 6/2007 |
| MX | 171286 A | 10/1993 |
| RU | 2087520 C1 | 8/1997 |
| RU | 2146693 C1 | 3/2000 |
| RU | 2177494 C1 | 12/2001 |
| WO | 200181715 A2 | 11/2001 |
| WO | 2006093799 A2 | 9/2006 |
| WO | 2008153633 A1 | 12/2008 |
| WO | 2009120238 A1 | 10/2009 |
| WO | 2012039910 A1 | 3/2012 |
| WO | 2012051009 A1 | 4/2012 |
| WO | 2013188144 A1 | 12/2013 |
| WO | 2014018082 A1 | 1/2014 |
| WO | 2014095813 A1 | 6/2014 |
| WO | 2016154529 A1 | 9/2016 |

OTHER PUBLICATIONS

McKillop, Alexander, et al. Further Functional-Group Oxidations Using Sodium Perborate. Tetrahedron, vol. 45, No. 11, pp. 3299 to 3306, 1989. Published in Great Britain (Doc. 2).

Varma, Rajender S., et al. The Urea-Hydrogen Peroxide Complex: Solid-State Oxidative Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999 (Doc. 3).

Jana, Nirmal K., et al. Phase-Vanishing Methodology for Efficient Bromination, Alkylation, Epoxidation, and Oxidation Reactions of Organic Substrates. Organic Letters, 2003, vol. 5, No. 21, pp. 3787-3790. Published on Web Sep. 16, 2003 (Doc. 4).

Khodaei, Mohammad Mehdi, et al. H2O2/Tf2O System: An Efficient Oxidizing Reagent for Selective Oxidation of Sulfanes. Synthesis, 2008; No. 11, pp. 1682-1684. Published on Web Apr. 11, 2008 (Doc. 5).

Kim, Sung Soo, et al. A Mild and Highly Efficient Oxidation of Sulfide to Sulfoxides with Periodic Acid Catalyzed by FeCl3. Synthesis, 2002, No. 17, pp. 2484-2486. Published USA Feb. 12, 2002 (Doc. 6).

Qian, Weixing, et al. Efficient and Highly Selective Oxidation of Sulfides to Sulfoxides in the Presence of an Ionic Liquid Containing Hypervalent Iodine. Synlett, 2006, No. 5, pp. 709-712. Published on Web Mar. 9, 2006 (Doc. 7).

Matteucci, Mizio, et al. Mild and Highly Chemoselective Oxidation of Thioethers Mediated by Sc(OTf)3. Organic Letters, 2003, vol. 5, No. 3, 235-237. Published on Web Jan. 11, 2003 (Doc. 8).

Mba, Myriam, et al. C3-Symmetric Ti(IV) Triphenolate Amino Complexes as Sulfoxidation Catalysts with Aqueous Hydrogen Peroxide. Organic Letters, 2007, vol. 9, No. 1, pp. 21-24. Published on Web Dec. 9, 2006 (Doc. 9).

Drago, Carmelo, et al. Vanadium-Catalyzed Sulfur Oxidation/ Kinetic Resolution in the Synthesis of Enantiomerically Pure Alkyl Aryl Sulfoxides. Agnew. Chem. Int. Ed, 2005, 44, pp. 7221-7223. Published on Web Oct. 17, 2005 (Doc. 10).

Egami, Hiromichi, et al. Fe(salan)-Catalyzed Asymmetric Oxidation of Sulfides with Hydrogen Peroxide in Water. J. Am. Chem. Soc., 2007, vol. 129, No. 29, pp. 8940-8941. Published on Web Jun. 29, 2007 (Doc. 11).

Sun, Jiangtao, et al. Efficient Asymmetric Oxidation of Sulfides and Kinetic Resolution of Sulfoxides Catalyzed by a Vanadium-Salan System. J. Org. Chem., 2004, vol. 69, No. 24, pp. 8500-8503. Published on Web Oct. 28, 2004 (Doc. 12).

Karimi, Babak, et al. Selective Oxidation of Sulfides to Sulfoxides Using 30% Hydrogen Peroxide Catalyzed with a Recoverable Silica-Based Tungstate Interphase Catalyst. Organic Letters, 2005, vol. 7, No. 4, pp. 625-628. Published on Web Jan. 25, 2005 (Doc. 13).

Ali, Mohammed Hashmat, et al. Ceric Ammonium Nitrate Catalyzed Oxidation of Sulfides to Sulfoxides. Synthesis, 2007, No. 22, pp. 3507-3511. Published on Web Oct. 16, 2007 (Doc. 14).

Imada, Yasushi, et al. Flavin Catalyzed Oxidations of Sulfides and Amines with Molecular Oxygen. J. Am Chem. Soc., 2003, vol. 125, No. 10, pp. 2868-2869. Published on Web Feb. 12, 2003 (Doc 15).

Varma, Rajender S., et al. The Urea-Hydrogen Peroxide Complex: Solid-State Oxidatives Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999 (Doc. 16).

Jana, Nirmal K.,e t al. Phase-Vanishing Methodology for Efficient Bromination, Alkylation, Epoxidation, and Oxidation Reactions of Organic Substrates. Organic Letters, 2003, vol. 5, No. 21, pp. 3787-3790. Published on Web Sep. 16, 2003 (Doc. 17).

Shaabani, Ahmad, et al. Green oxidations. The use of potassium permanganate supported on manganese dioxide. Tetrahedron, 2004, 60, pp. 11415-11420. Published on Web Oct. 12, 2004 (Doc. 18).

Wozniak, Lucyna A., et al. Oxidation in Organophosphorus Chemistry: Potassium Peroxymonosulphate. Tetrahedron, 1999, 40, pp. 2637-2640. Received Oct. 13, 1998; Accepted Feb. 3, 1999. No published date. (Doc. 19).

Akasaka, Takeshi,e t al. Singlet Oxygen Oxidation of Organophosphorus Compounds: Cooxidation of Olefin with Phosphadioxirane. Quimica Nova, 1993, 16, pp. 325-327. No published date or location (Doc. 20).

Milner, O.I., et al. Determination of Trace Materials in Crudes and Other Petroleum Oils. Analytical Chemistry, vol. 24, No. 11. Published Nov. 1952, USA (Doc. 21).

Aida, Tetsuo, et al. Development of an Efficient Coal-Desulfurization process: "Oxy-Alkalinolysis". Technical Report Resource Conference: American Chemical Society symposium on coal liquefaction, pp. 328-334. Kansas City, MO USA. Published Sep. 1, 1982 Ames Lab., IA (USA); Advanced Fuel Research, Inc., East Hartford, CT (USA) (Doc. 22).

Aida, Tetsuo, et al. Reaction of Dibenzothiophene Sulfone with Alkoxides. Tetrahedron Letters (1983), vol. 24, No. 34, pp. 3543-3546. USA (Doc. 23).

Oviedo, Alberto, et al. Deoxydesulfurization of sulfones derived from dibenzothiophene using nickel compounds. Journal of Molecular Catalysis A: Chemical, (2008) 293, pp. 65-71. USA (Doc. 24).

Ripin, D.H., et al., "pKa's of Inorganic and Oxo-Acids", [http://evans.harvard.edu/pdf/evans_pka_table.pdf]; published Apr. 11, 2005, accessed Apr. 29, 2013. 6 pages. (6964CIPPCT ISR).

Application No. PCT/US2008/82095, International Search Report and the Written Opinion of the International Searching Authority, or the Declaration dated Mar. 20, 2009. 12 pages. (6180PCT).

Application No. PCT/US2011/50159, International Search Report and the Written Opinion of the International Searching Authority dated Jan. 12, 2012, 11 pages. (6885PCT).

Application No. PCT/US2011/54840, International Search Report and the Written Opinion of the International Searching Authority dated Mar. 12, 2012, 8 pages. (6964PCT).

Application No. PCT/US2011/70243, Intematinoal Search Report and the Written Opinion of the International Searching Authority dated Feb. 25, 2013, 40 pages. (6964CIP-PCT).

(56) References Cited

OTHER PUBLICATIONS

Application No. PCT/US2013/43843, International Search Report and the Written Opinion of the International Searching Authority dated Aug. 27, 2013, 7 pages. (5861CIPPCT).
Energy Intelligence Group. (2007). "The Crude Oils and their Key Characteristics," 7 pgs. (Available at http://www.energyintel.com/pages/eig_article.aspx?DocId=200017).
El Nady, M. M. et al. (2013). Journal of Chemical and Engineering Data, 1, 1-7.
Canadian Office Action for Appln. No. 2,719,058, dated Dec. 31, 2014 (6180CA).
Korean Office Action Translation for KR Appln. No. 2009-7024832 (6928KR-NY).
Indian Office Action for IN Application No. 1992/MUMNP/2010, dated Mar. 26, 2015 (6180IN).
European Office Action for Application No. 11 833 137.0-1361, dated Aug. 13, 2015.
Office Action (dated Mar. 20, 2012) for U.S. Appl. No. 12/598,474, filed Apr. 23, 2010.
Office Action (dated Oct. 15, 2012) for U.S. Appl. No. 12/598,474, filed Apr. 23, 2010.
Office Action (dated Sep. 11, 2014) for U.S. Appl. No. 12/598,474, filed Apr. 23, 2010.
Advisory Action (dated Dec. 10, 2014) for U.S. Appl. No. 12/598,474, filed Apr. 23, 2010.
Office Action (dated May 11, 2015) for U.S. Appl. No. 12/598,474, filed Apr. 23, 2010.
Office Action (dated Nov. 20, 2015) for U.S. Appl. No. 12/598,474, filed Apr. 23, 2010.
Final Office Action (dated May 6, 2016) for U.S. Appl. No. 12/598,474, filed Apr. 23, 2010.
Notice of Allowance (dated Aug. 9, 2016) for U.S. Appl. No. 12/698,474, filed Apr. 23, 2010.
Office Action (dated Jun. 15, 2016) for U.S. Appl. No. 14/246,508, filed Apr. 7, 2014.
Office Action (dated Apr. 22, 2016) for U.S. Appl. No. 14/286,342, filed May 23, 2014.
Office Action (dated Apr. 20, 2016) for U.S. Appl. No. 14/573,230, filed Dec. 17, 2014.
International Search Report and Written Opinion (dated Aug. 4, 2015) for PCT Application No. PCT/US15/31461.
International Search Report and Written Opinion (dated Aug. 5, 2015) for PCT Application No. PCT/US15/32417.
International Search Report and Written Opinion (dated Feb. 16, 2016) for PCT Application No. PCT/US15/064587.
International Search Report and Written Opinion (dated Jun. 20, 2016) for PCT Application No. PCT/US16/024201.
Office Action for Canadian Application No. 2,719,058, dated Aug. 9, 2016.
Notice of Allowance (dated Jul. 9, 2012) for U.S. Appl. No. 12/888,049, filed Sep. 22, 2010.
Office Action (dated Jun. 6, 2013) for U.S. Appl. No. 13/660,371, filed Oct. 25, 2012.
Office Action (dated Nov. 12, 2013) for U.S. Appl. No. 13/660,371, filed Oct. 25, 2012.
Notice of Allowance (dated Jun. 24, 2014) for U.S. Appl. No. 13/660,371, filed Oct. 25, 2012.
Office Action (dated Jun. 25, 2014) for U.S. Appl. No. 14/246,597, filed Apr. 7, 2014.
Notice of Allowance (dated Aug. 14, 2014) for U.S. Appl. No. 14/246,597, filed Apr. 7, 2014.
Office Action (dated Jun. 19, 2014) for U.S. Appl. No. 14/159,833, filed Jan. 21, 2014.
Notice of Allowance (dated Oct. 27, 2014) for U.S. Appl. No. 14/159,833, filed Jan. 21, 2014.
Office Action (dated Feb. 22, 2017) for U.S. Appl. No. 14/629,169, filed Feb. 23, 2015.
Notice of Allowance (dated Jul. 21, 2017) or U.S. Appl. No. 14/629,169, filed Feb. 23, 2015.
Notice of Allowance (dated Feb. 13, 2012) for U.S. Appl. No. 12/904,446, filed Oct. 14, 2010.
Office Action (dated Aug. 15, 2013) for U.S. Appl. No. 13/560,584, filed Jul. 27, 2012.
Office Action (dated Dec. 17, 2013) for U.S. Appl. No. 13/560,584, filed Jul. 27, 2012.
Office Action (dated Feb. 27, 2014) for U.S. Appl. No. 13/560,584, filed Jul. 12, 2012.
Notice of Allowance (dated Apr. 29, 2014) for U.S. Appl. No. 13/560,584, filed Jul. 12, 2012.
Office Action (dated Feb. 24, 2017) for U.S. Appl. No. 14/246,508, filed Apr. 7, 2014.
Office Action (dated Jan. 21, 2015) for U.S. Appl. No. 14/287,916, filed May 27, 2014.
Office Action (dated Jun. 19, 2015) for U.S. Appl. No. 14/287,916, filed May 27, 2014.
Notice of Allowance (dated Aug. 4, 2015) for U.S. Appl. No. 14/287,916, filed May 27, 2014.
http://evans.rc.fas.harvard.edu/pdf/evans _pKa table. Pdf.
Jiang, Benpeng et al., ("Hydrothermal synthesis of rutile TiO2 nanoparticles using hydroxyl and carboxyl group-containing organics as modifiers." Materials Chemistry and Physics, pp. 231-235), 2006.
Chinese Patent Application No. 201380015161.1, Office Action dated Nov. 16, 2015.
European Patent Application No. 13 803 981.3, Extended European Search Report dated Mar. 11, 2016, 10 pages.
European Patent Application No. 13 803 981.3, Office Action dated Dec. 6, 2016, 7 pages.
GCC Patent Application No. GC2013-24619, Examination Report dated Nov. 26, 2016, 4 pages.
Indian Patent Application No. 9011/CHENP/2014, Office Action dated Aug. 27, 2018.
Iraqi Patent Application No. 2013/188, Office Action dated Jul. 21, 2013.
Mexican Patent Application No. MX/a/2014/014432, Office Action dated Jul. 31, 2017.
Russian Patent Application No. 2014152661/04, Search Report dated Apr. 25, 2017.
Australian Patent Application No. 2008353354, Office Action dated Mar. 23, 2013, 4 pages.
Canadian Patent Application No. 2,719,058, Office Action dated Jun. 19, 2015, 4 pages.
Canadian Patent Application No. 2,719,058, Office Action dated Jan. 11, 2016, 3 pages.
Canadian Patent Application No. 2,719,058, Notice of Allowance dated Feb. 21, 2017.
Chilean Patent Application No. 1040-2010, Office Action dated Mar. 3, 2014.
Chilean Patent Application No. 1040-2010, Office Action dated Oct. 3, 2014.
Chinese Patent Application No. 200880128410.7, Office Action dated Jan. 29, 2013.
Chinese Patent Application No. 200880128410.7, Office Action dated May 23, 2013.
Chinese Patent Application No. 200880128410.7, Office Action dated Dec. 3, 2013.
Egyptian Patent Application No. 2010/09/1614, Office Action dated Sep. 26, 2012.
Egyptian Patent Application No. 2010/09/1614, Office Action dated Feb. 3, 2013.
Egyptian Patent Application No. 2010/1614 D2, Office Action dated Feb. 2, 2014.
Egyptian Patent Application No. 2010/1614 D1, Office Action dated Dec. 30, 2013.
European Patent Application No. 08873622.8, Extended European Search Report dated Apr. 24, 2013, 8 pages.
GCC Patent Application No. GCC/P.2009/13131, Examination Report dated Apr. 17, 2014, 6 pages.
GCC Patent Application No. GCC/P.2009/13131, Examination Report dated Feb. 3, 2016, 9 pages.
GCC Patent Application No. GCC/P/2009/27433, Examination Report dated May 13, 2018, 5 pages.

(56) References Cited

OTHER PUBLICATIONS

Indonesian Patent Application No. W00201003533, Office Action dated Jun. 16, 2014, 2 pages.
Iraqi Patent Application No. 285/2010, Office Action dated Feb. 24, 2013.
Iraqi Patent Application No. 285/2010, Office Action dated May 26, 2013.
Iraqi Patent Application No. 285/2010, Office Action dated Feb. 11, 2014.
Japanese Patent Application No. 2011-501781, Office Action dated Sep. 12, 2013, 4 pages.
GCC Patent Application No. GC 2011-19492, Examination Report dated Dec. 29, 2015, 4 pages.
GCC Patent Application No. GC 2011-19492, Examination Report dated Aug. 24, 2017, 4 pages.
Examiner's Action in Canadian Patent Application No. 2,810,690 dated Apr. 8, 2018.
Office Action in Canadian Patent Application No. 2,810,690 dated Jul. 24, 2017.
Office Action in Canadian Patent Application No. 2,808,640 dated Oct. 17, 2017, 3 pages.
Office Action in Indian Patent Application No. 1766/CHENP/2013 dated Jan. 25, 2018.
Office Action in Indian Patent Application No. 1765/CHENP/2013 dated Feb. 9, 2018.
Mexican Patent Application No. MX/a/2015/000923, Office Action dated Sep. 12, 2017. 4 pages.
Notice of Allowance (dated Feb. 13, 2012) for U.S. Appl. No. 12/977,639, filed Dec. 23, 2010.
Office Action (dated Aug. 19, 2013) for U.S. Appl. No. 13/493,240, filed Jun. 11, 2012.
Office Action (dated Jan. 3, 2014) for U.S. Appl. No. 13/493,240, filed Jun. 11, 2012.
Office Action (dated Mar. 20, 2014) for U.S. Appl. No. 13/493,240, dated Jun. 11, 2012.
Notice of Allowance (dated Jul. 17, 2014) for U.S. Appl. No. 13/493,240, dated Jun. 11, 2012.
Office Action (dated Apr. 11, 2012) for U.S. Appl. No. 12/933,898, filed Sep. 22, 2010.
Office Action (dated Oct. 18, 2012) for U.S. Appl. No. 12/933,898, filed Sep. 22, 2010.
Notice of Allowance (dated Nov. 9, 2012) for U.S. Appl. No. 12/933,898, filed Sep. 22, 2010.
Office Action (dated Nov. 10, 2014) for U.S. Appl. No. 13/734,054, filed Jan. 4, 2013.
Notice of Allowance (dated Feb. 27, 2015) for U.S. Appl. No. 13/734,054, filed Jan. 4, 2013.

\* cited by examiner

ADSORBENTS AND METHODS OF USE

CROSS REFERENCE TO RELATED APPLICATIONS

This application claims the priority and benefit of U.S. Patent Application No. 62/138,475 filed Mar. 26, 2015, entitled "ADSORBENTS AND METHODS OF USE", the content of which is incorporated herein by reference.

FIELD OF THE TECHNOLOGY

The following relates generally to embodiments of adsorbents and methods of using adsorbents. More specifically, the following relates to adsorbents with an affinity for binding heteroatom compounds present in hydrocarbon feed streams.

BACKGROUND

Hydrocarbon fluids including crude oils and heavy crude oils contain heteroatoms that should be removed and refined prior to the hydrocarbon being transported or used for commercial consumption. These heteroatoms include compounds containing such elements as sulfur, nitrogen, nickel, vanadium and acidic oxygenates. The heteroatoms may be present in compounds at quantities that negatively impact the refinery processing of the crude oil fractions.

Crude oils that have unsuitable heteroatom properties limit the crude from being economically transported or processed using conventional facilities. These types of crude hydrocarbons may be commonly referred to as "disadvantaged crudes." Disadvantaged crudes often contain relatively high levels of residue. High residue crudes may be treated at high temperatures to convert the crude to coke. Alternatively, high residue crudes are typically treated with water at high temperatures through the use of steam cracking to produce less viscous crudes and/or crude mixtures. During processing, water removal from the less viscous crudes and/or crude mixtures may be difficult using conventional means.

Disadvantaged crudes may include hydrogen deficient hydrocarbons. When processing hydrogen deficient hydrocarbons using previously known methods, consistent quantities of hydrogen are generally needed to be added, particularly if unsaturated fragments resulting from cracking processes are produced. Hydrogenation during processing, which typically involves the use of an active hydrogenation catalyst, may be needed to inhibit unsaturated fragments from forming coke. Hydrogen is costly to produce and/or costly to transport to treatment facilities.

Disadvantaged crudes often include organically bound heteroatoms (for example, sulfur, oxygen, and nitrogen). Organically bound heteroatoms may, in some situations, have an adverse effect on catalysts. Alkali metal salts and/or alkaline-earth metal salts have been used in processes for desulfurization of residue. These processes tend to result in poor desulfurization efficiency, production of oil insoluble sludge, poor demetallization efficiency, formation of substantially inseparable salt-oil mixtures, utilization of large quantities of hydrogen gas, and/or relatively high hydrogen pressures.

Some processes for improving the quality of crude include adding a diluent to disadvantaged crudes to lower the weight percent of components contributing to the disadvantaged properties. Adding diluent, however, generally increases costs of treating disadvantaged crudes due to the costs of diluent and/or increased costs to handle the disadvantaged crudes. Addition of diluent to disadvantaged crude may, in some situations, decrease stability of such crude.

In the United States and other countries around the world, there has been emphasis by governments to pass stricter standards for hydrocarbon fluid being used commercially that derive from crude oils. For example, in the US, it is strictly required that hydrocarbon fluids, such as on-road diesel fuel, meet the required ultra-low sulfur specifications of 15 ppm sulfur. Due to the extremely low nature of the government imposed specifications, the oil and fuel industry has been continuously evolving their heteroatom removal processes to realize greater and greater heteroatom removal without incurring exorbitant expenses.

One method of removing unwanted heteroatoms from hydrocarbon fluids is through the use of adsorbents or adsorbent beds which attract, bind, separate and remove the heteroatom containing hydrocarbon compounds present in hydrocarbon feeds coming in contact with the adsorbent. The effectiveness of an adsorbent may depend on the adsorbent's binding affinity and ability to attract the heteroatoms in the hydrocarbon fluid. In order to be economical, the heteroatom compound attracted to an adsorbent should be removed from the adsorbent in a manner that allows the adsorbent to be used again. Many adsorbents strongly bind sulfur and other heteroatom compounds, but require high temperatures and severe conditions to both adsorb and to remove the heteroatom compounds, often burning them in the process. Additionally, many refinery products or intermediates cannot be heated to severe temperatures without inducing undesired chemical changes to the hydrocarbon feeds. Thus, there is a need for a new and novel adsorbent capable of binding heteroatoms such as sulfur and nitrogen compounds with a high affinity, yet also capable of easily releasing those heteroatoms at low temperatures and mild conditions.

Advantages of the system and methods described herein over the prior art, include the ability of the adsorbents to be selectively modified and fine-tuned with various alcohol and polyol functional groups attached to the metal complex of the adsorbent, allowing for the adsorbent to have an increased affinity and adsorbing strength for particular characteristics of the heteroatoms being removed from the hydrocarbon feeds as well as selectivity for one or more classes of heteroatoms. The adsorbents of the disclosed system and methods also enjoy an advantage of heteroatom removal from the heteroatom-bound adsorbent at low temperatures and pressures by contacting the heteroatom-bound adsorbent with one or more solvents such as a hydroperoxide or peracid to regenerate the adsorbent at low temperatures and pressures.

SUMMARY OF THE TECHNOLOGY

A first embodiment of this disclosure relates generally to an adsorbent composition comprising a metal complex including a titanyl, wherein a titanium molecule of the titanyl is covalently bound to an alcohol or a polyol; and an inorganic oxide support of the metal complex bound to the titanium molecule of the titanyl.

A method for reducing a heteroatom content of a hydrocarbon feed comprising the steps of providing an adsorbent having a metal complex bound to an inorganic oxide support, wherein the metal complex is a titanyl having a titanium molecule covalently bonded to an alcohol or polyol; contacting the adsorbent with a hydroperoxide or a peracid, forming an activated adsorbent; contacting the activated adsorbent with the hydrocarbon feed; binding a heteroatom present in the hydrocarbon feed to the activated adsorbent, forming a heteroatom-bound adsorbent, leaving behind a hydrocarbon feed having a reduced heteroatom content; and separating the hydrocarbon feed having the reduced heteroatom content from the heteroatom-bound adsorbent.

DETAILED DESCRIPTION

Figure 1:
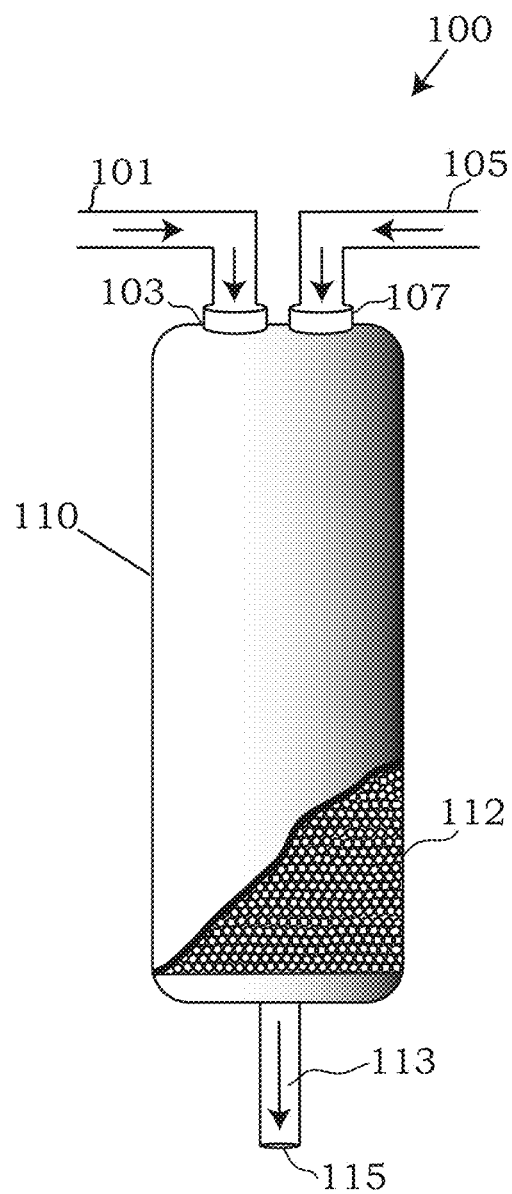
FIG. 1 depicts a partially exposed view of an embodiment of a system for reducing the heteroatom content of a hydrocarbon feed.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Certain embodiments discussed in detail throughout this application may contain terms herein which may be defined as follows:

An "adsorbent" may refer to a solid substance that has a property enabling the attachment one or more other substances (known as the "adsorbate") to the surface of the adsorbent either through chemisorption, which involves covalent bonding, or physisorption, involving intermolecular forces between the adsorbent and the adsorbate, which may include Van der Waals forces, electrostatic forces or hydrogen bonding in some embodiments. The adsorbent may be a porous material, and the adsorption process may occur at the wall of the adsorbent's pores or at a particular site inside the pore of the adsorbent.

An "adsorbent bed" may refer to a vessel, tube, pipe or other container filled with adsorbent. The adsorbent bed may be incorporated as part of a chemical reactor, distillation column or other equipment known or used in the art.

An "alcohol" may refer to an organic compound characterized as having one or more hydroxyl groups attached to a carbon atom of an alkyl group (hydrocarbon chain). The alkyl group may be represented by the designation of an "R" group. The most basic formula for an alcohol may be depicted as R—OH.

A "functional group", may refer to a portion of a molecule that has a recognizable or classified group of bound atoms. The functional group may give a substance its molecular properties. Throughout this application a functional group may be designated with as an R group in various chemical formulas and structures. As understood by individuals skilled in the art, a R group designated in a chemical formula may be an element of the Periodic Table of Elements or a functional group, unless otherwise specifically denoted as a particular element or functional group. Examples of functional groups may include alkanes, alkenes, alkynes, aromatics, heterocyclics, alcohols, haloalkane, aldehyde, ketone, ether, ester, carboxylic acid, amine, amide, nitrile, nitrite, nitrate, chromate, carbonate, bicarbonate, imine, sulfhydryl, carbonyl, carboxyl, amino, phosphate, hydrogen phosphate, dihydrogen phosphate, sulfate, sulfite, thiosulfate, oxides, oxalate, formate, cyanide, acetate, permanganate, ammonium, etc.

A "heteroatom" may refer to any atom of a hydrocarbon that is neither hydrogen nor carbon. Heteroatom containing compounds found in a hydrocarbon feed may include in a mixture of one or more heteroatom-containing hydrocarbon compounds comprising sulfur, nitrogen, oxygen, phosphorous, chlorine, bromine, iodine, nickel, vanadium or iron heteroatoms. Common sulfur containing contaminants mixed with hydrocarbons in a hydrocarbon feed may include, but are not limited to, mercaptans, sulfides, disulfides, thiophenes, benzothiophenes, dibenzothiophenes and benzo-naphthothiophenes. Other heteroatoms, may include heterocyclic heteroatom compounds such as aziridine, azirine, thiirane, thiirene, diazirine, oxaziridine, azetidine, azete, thietane, thiete, diazetidine, dithietane, dithiete, pyrrolidiine, pyrrole, thiolane, thiophene, imidazolidine, imidazole, pyrazole, pyrazolidine, oxazolidine, oxazole, isooxazolidine, isoxazole, thizolidine, thiazole, isothiazolidine, isothiazole, dithiolane, triazoles, furan, oxadiazole, thiadiazole, dithiazole, tetrazole, piperdine, pyridine, thiane, thiopyran, piperazine, diazones, morpholine, oxazine, dithiane, dithiine, triazone, trithiane, tetrazine, azepane, azepine, thiepane, thiepine, homopiperazine, diazepine, thiazepine, azocane, azocine, and combinations thereof.

A "heteroatom content" may refer to the weight of the heteroatom component in the hydrocarbon feed. For example, in a hydrocarbon feed, the heteroatom content may be expressed as a weight fraction or weight % (wt %) of the heteroatom over the total weight of the hydrocarbon/heteroatom mixed together (hereinafter "hydrocarbon feed mixture"):

$$\frac{\text{weight of the heteroatom component}}{\text{total weight of the hydrocarbon feed mixture}} \times 100 = \text{wt \%}.$$

A "heteroatom-bound adsorbent" may refer to one or more heteroatom molecules adsorbed to the surface of an adsorbent.

A "hydrocarbon" may refer to a substance that has primary components of hydrogen and carbon. Examples of hydrocarbons may include, but are not limited to both saturated and unsaturated hydrocarbons, aromatic hydrocarbons, alkanes, alkenes, alkynes, aryls and cycloalkanes.

A "hydrocarbon feed" may refer to a stream of hydrocarbons. The hydrocarbon feed may include, but is not limited to, crude oils, heavy or extra heavy crude oils, crude oils containing significant quantities of residue or pitch, bitumen, disadvantaged crudes, contaminated hydrocarbon streams, hydrocarbons derived from tar sands, shale oil, crude atmospheric residues, asphalts, hydrocarbons derived from liquefying coal and hydrocarbons obtained from a refinery process or mixtures thereof. A hydrocarbon feed may include hydrocarbons, hydrocarbon distillates and/or fractions and may include a mixture of one or more heteroatoms.

A "hydroperoxide" may include any chemical compound having the general formula ROOH, wherein R is an element of the Periodic Table of Elements or a functional group.

An "inorganic oxide" may refer to a binary compound of oxygen bound to an inorganic element of the Periodic Table of Elements or an inorganic functional group.

A "metal complex" may refer to substance or compound having a central atom or ion, such as a metal atom, transition metal atom or an ion acting as a coordination center surrounded by an array of bound molecules, ligands or complexing agents. A metal complex may also be referred to as a "coordination complex".

A "peracid" (also known as a peroxy acid) may refer to a compound having a peroxy group (—O—O—) and an acidic group. The peracid may have the general formula

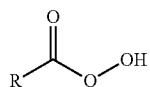

wherein R is an element of the Periodic Table of Elements, an inorganic or an organic functional group thereof.

A "polyol" may refer to an alcohol having more than one hydroxyl functional (—OH) group. For example, diol, triol, sugars, inositols, etc. A polyol may sometimes be referred to as a polyhydric alcohol, polyhydroxy alcohol or polyalcohol.

A "reduced heteroatom content" may refer to a substance or compound (such as a hydrocarbon feed) having an amount of heteroatoms present that is less than the amount of heteroatoms of a starting material. For example, a hydrocarbon feed with a reduced heteroatom content may refer to a hydrocarbon feed that has less heteroatoms present than the initial, starting hydrocarbon feed prior to the removal of any heteroatoms.

A "regenerated adsorbent" may refer to an adsorbent that has previously adsorbed an adsorbate, and subsequently has had the adsorbate removed, allowing for the adsorbent to further adsorb another adsorbate.

A "solvent" may refer to a component of a solution capable of dissolving and/or diluting another substance (referred to as the "solute"). In some instances a solvent may dissolve the solute entirely, while in other instances, the solvent may not dissolve all components of the solute. For example, in heavy oil processes, the solvent may not dissolve the solute entirely. Components, such as the asphaltene, of the heavy oil may not dissolve or may only partially dissolve with certain solvents.

A "support" may refer to a material with a high degree of surface area which an adsorbent may be affixed or bonded to. An adsorbent may be dispersed over the support surface to maximize the surface area of the adsorbent being used. Embodiments of the support may be inert, however in alternative embodiments the support may also participate or facilitate a chemical reaction.

A "titanyl" may refer to chemical group comprising titanium and oxygen molecules covalently bonded, forming a $TiO^{+2}$ cation. A distinguishing feature of a titanium (IV) titanyl may be the presence of a titanium-oxygen double bond. A titanyl compound may be represented by the general formula:

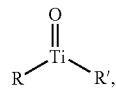

wherein R and R' are each independently selected elements from the Periodic Table of Elements or one or more functional groups known by individuals skilled in the art.

Referring to the drawings, FIG. 1 depicts an embodiment of a capable of reducing the heteroatom content of a heteroatom-containing hydrocarbon feed. Embodiments of the system 100 may include an vessel 110 which may be an adsorbent bed, packed with an adsorbent 112. The vessel 110 may be any size, shape or volume. The size, shape and/or volume of the vessel 110 may vary depending on the amount of adsorbent 112 being packed into the vessel 110 and the volume of the hydrocarbon feed expected to be provided to the vessel 110 for heteroatom removal.

The vessel 110 may be constructed out of any strong, durable or corrosive resistant material. Such strong, durable or corrosive resistant materials may include stainless steel or stainless steel alloys, including but not limited to 316 or 316L stainless steel, alloys A-286 (iron nickel-chromium alloy), alloy 20 (nickel-chromium-molybdenum stainless steel), alloy 230 (Nickel, chromium, tungsten, cobalt alloy), alloy 400 (nickel-copper alloy), alloy 600 (nickel, chromium and iron alloy), alloy 600 (nickel, chromium, molybdenum, niobium alloy), alloy B-2/B-3 (nickel molybdenum alloys), alloy c276, nickel 200, tantalum, titanium grades 2, 3, 4, and 7, zirconium 702 and zirconium 705.

As depicted in FIG. 1, the vessel 110 may be filled or packed with a solid adsorption bed of adsorbent 112. Embodiments of the adsorbent 112, although depicted as spherical in the figures, may be prepared and designed into any two-dimensional or three dimensional shape. Exemplary shapes of the adsorbent 112 may be shapes having the highest amount of surface area for adsorbing heteroatoms present in a hydrocarbon feed. Examples of shapes may include rods, spheres, pellets, cylinders, multiple lobe shapes including 2-lobe, 3-lobe, 4-lobe, etc., helical twisting shapes, cubes, tetrahedrons, hexahedrons, octahedrons, cuboctahedrons, combinations and truncated variations thereof.

Embodiments of the adsorbent 112 may be comprised of any material capable of adsorbing one or more different heteroatoms known in the art to be found alongside and mixed with the hydrocarbons and hydrocarbon feeds disclosed herein, including sulfur and/or nitrogen containing heteroatoms and heterocyclic heteroatoms. In some embodiments, the adsorbent 112 may comprise a metal complex having a central metal atom or ion. Embodiments of the metal complex of the adsorbent may follow the general formula $M_mO_m(OR")_n$ wherein M is the central atom selected from Ti, Zr, or Hf and R" at each occurrence may be individually a functional group having at least one hydroxide. For example, the functional groups of R" may be a substituted alkyl group containing at least one OH group, a substituted cycloalkyl group containing at least one OH group, a substituted cycloalkylalkyl group containing at least one OH group, a substituted heterocyclyl group containing at least one OH group, or a heterocyclylalkyl containing at least one OH group. The variable m is an integer from 1 to 8 or more; and n is an integer from 1 to 8 or more, as described in US patent publication US2011/0119988A1, the teachings of which are incorporated herein by reference, in its entirety.

Consistent with the general formula $M_mO_m(OR'')_n$, some embodiments of the adsorbent 112 may include a metal complex comprising a titanyl, zirconyl or hafnyl molecule bound to one or more additional functional groups. A chemical formula describing the structure of the titanyl metal complex may be described as follows:

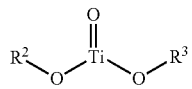

wherein, $R^2$ and $R^3$ are each independently hydrogen or a carbon containing functional group having at least one OH moiety. For example, in some embodiments of the titanyl the moieties substituted for $R^2$ and $R^3$ may include one or more alcohols, diols or other polyol moieties attached to the central titanium metal atom of the metal complex. In some embodiments, an alcohol may have the general formula ROH where R is a carbon chain between $C_1$-$C_{30}$ or more. A diol may be an alcohol having two OH groups and may be represented by the general formula $R(OH)_2$. A polyol may refer to a type of alcohol having two or more OH moieties bound to the carbon chain R. An example of a general formula of a polyol may be $R(OH)_x$, wherein x>1, such as a vicinal diol. Likewise, a zirconyl or hafnyl may follow the same general formula as the titanyl described above, however instead of titanium representing the central metal atom, zirconium or hafnium may be substituted.

Specific examples of alcohols, diols or other polyol moieties that may be part of the metal complex of the adsorbent may include glycerol, ethylene glycol, propylene glycol, diethylene glycol, dipropylene glycol, dithioerythritol, axomadol, azidamfenicol, alfatradiol, bronopol, 1,4-butynediol, capsidiol, chloramphenicol, cyclohexane-1,2-diol, cyclohexanedimethanol, estradiol, ethambutol, methane diol, triethylene glycol, methanol, ethanol, propanol, butanol, pentanol, hexanol, hetpanol, oxanol, polypropylene glycol, 1,2-propylene glycol, glycerine, trimethylolpropane, pentaerythritol, sorbitol, sucrose other sugars and combinations thereof.

In one or more embodiments, wherein the adsorbent 112 may be comprised of a titanyl having the metal Ti molecule bound via a double bond to oxygen, forming an oxotitanium (IV) with two constituent polyalcohol functional groups ($OR^2$, $OR^3$) bound to the titanium atom, the adsorbent may be described generally by the nomenclature bis(polyol) oxotitanium(IV). As the embodiment of the polyol present in the general formula changes for $OR^2$ and $OR^3$, the change in the polyol of the general formula may be reflected in the name of a particular embodiment. For example, in an embodiment of an adsorbent 112 having a titanyl and glycerol substituted for the polyol, the adsorbent 112 may be described as bis(glycerolato)oxotitanium (IV). The nomenclature may use "glycerolato" instead of "glycerol" because when the glycerol binds to the titanium atom, one of the hydrogens of the glycerol's OH groups may be removed in order to covalently bind to the central titanium atom. Likewise, continuing with the pattern of the nomenclature as described, if instead of using glycerol, ethanol, propanol or butanol were used, the resulting adsorbent 112 may be referred to as bis(ethanolato)oxotitanium (IV), bis(propanolato)oxotitanium (IV) and bis(butanolato)oxotitanium (IV) respectively. Other examples of adsorbents may include bis(sorbitolato)oxotitanium(iv), bis(erythritolato)oxotitanium (IV) and bis(mannitolato)oxotitanium(IV).

Embodiments of adsorbents 112 may further include a support material bound to the metal complex. In some embodiments, the support may include one or more inorganic oxides as the support. The inorganic oxide support may include oxides of elements of groups I-A, I-B, II-A, II-B, III-A, III-B, IV-A, IV-B, V-A, V-B, VI-B, VII-B, and VIII-B, of the Periodic Table of the Elements. For example, inorganic oxides may include, but not limited to copper oxides, silicon dioxide, aluminum oxide, and/or mixed oxides of copper, silicon and aluminum, $Li_2O$, $Na_2O$, $K_2O$, $Rb_2O$, $Cs_2O$, $Fr_2O$, BeO MgO, CaO, SrO, BaO, $ZrO_2$, $TiO_2$, talc and/or combinations thereof.

The amounts of the adsorbent 112 containing the metal complex and an inorganic oxide support may be adjusted to a mass ratio between the metal complex and inorganic oxide support. In some embodiments, the mass ratio between the metal complex and the inorganic oxide support of the adsorbent 112 may be within a range of 0.1:99.9 to 99:1. For example in some embodiments, the mass ratio of the metal complex to support may be 0.1:99.9, 0.5:99.5, 1:99, 10:90. 25:75, 30:70, 40:60, 50:50, 60:40, 70:30. 75:25, 90:10, 99:1, 99.5:0.5, 99.9:0.1 and any ratio in between.

In some embodiments, the adsorbent 112 may be activated to an activated adsorbent by being treated with a hydroperoxide or peracid. Examples of suitable hydroperoxides and peracids may include, but are not limited to, hydrogen peroxide, tert-butyl hydroperoxide, tert-amyl hydroperoxide, ethylbenzene hydroperoxide, cumyl hydroperoxide, tetrahydronaphthalene hydroperoxide, and other organo-hydroperoxides know by those skilled in the art, performic acid, peracetic acid, and other per-acids known by those skilled in the art. Embodiments of a titanyl metal complex, once activated into an activated adsorbent may produce a peroxytitanate which may follow the general formula:

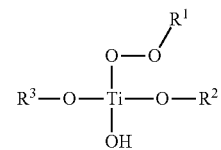

wherein $R^1$ is a hydrogen or carbon containing functional group, $R^2$ and $R^3$ are each independently hydrogen or a carbon containing functional group having at least one OH moiety. Similar to the $R^2$ and $R^3$ described above for the titanyl adsorbent 112, the $R^2$ and $R^3$ of activated adsorbent may also be substituted with one or more alcohols or polyols as described above. Furthermore, in an embodiment wherein the activated adsorbent is further bound to a support material, at least one of $OR^2$ or $OR^3$ may be bound to an inorganic oxide support. Likewise, wherein the starting metal complex is a zirconyl or hafnyl, the corresponding zirconyl or hafnyl may be activated in the same manner as the titanyl and follow a similar general formula, whereby the Ti atom is replaced with a Zr or Hf atom respectively.

Embodiments of the activated adsorbent's metal complex may be generally described using the general nomenclature (hydroxy)bis(polyol)(hydroperoxo)titanium(IV) or (hydroxy)bis(polyol)(organoperoxo)titanium(IV). The substitution of the polyol may be dependent on the polyol used to form the activated adsorbent complex, while the substitution of the hydroperoxo or organoperoxo group may depend on the type of hydroperoxide or peracid used to activate the adsorbent 112 into an activated adsorbent. For example, in some embodiments, the adsorbent may be derived from a titanyl metal complex having glycerol substituted from $OR^2$ and $OR^3$ and thus start out as bis(glycerolato)oxotitanium (IV) as described above. Subsequently, the bis(glycerolato)oxotitanium(IV) may be activated by being contacted with a peracid or hydroperoxide. For instance, tert-butyl hydroperoxide. The resulting activated adsorbent may be referred to as (hydroxy)bis(glycerolato)(tert-butyl hydroperoxo)titanium(IV) having the chemical structure:

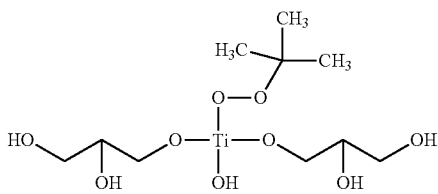

Likewise, if the starting adsorbent 112 was the titanyl metal complex bis(sorbitolato)oxotitanium(IV) and the titanyl was activated with the same tert-butyl hydroperoxide as described immediately above, the resulting activated adsorbent may be similarly described as a (hydroxy)bis(sorbitolato)(tert-butyl hydroperoxo)titanium(IV).

Similar to substituting the alcohol or polyol group, the nomenclature of the activated adsorbent may change by changing the selected hydroperoxide or peracid as well. Using the bis(sorbitolato)oxotitanium(IV) as the starting material, however this time instead of using tert-butyl bydroperoxide, a cumyl hydroperoxide is used to activate the adsorbent, the resulting activated adsorbent may be referred to as (hydroxy)bis(sorbitolato)(cumyl hydroperoxo)titanium(IV). Accordingly, a person skilled in the art should understand from these examples the changes in name that would result from the different combinations of alcohols/polyols and hydroperoxides/peracids that may be used to construct the adsorbent and activated adsorbent.

Embodiments of the adsorbents and activated adsorbent described above may be capable of binding heteroatoms present in a hydrocarbon feed or stream.

One particular and unexpected effect of the disclosed adsorption material and activated material is the ability of the described adsorbents to selectively adsorb a particular heteroatom compound, class of heteroatom compounds, or heteroatoms having a particular physical characteristic (such as molecular size). The adsorbent and activated adsorbent may be selectively tuned or selected for the presence different heteroatom compounds by adjusting the particular alcohol or polyol functional groups attached to the metal complex. A particular alcohol or polyol functional group may be selected having a higher affinity for the characteristics of the heteroatom compound being adsorbed. For example, an alcohol or polyol may be selected with a varying strength of adsorption, strong or weak electrostatic attraction to classes of heteroatom compounds or restrict access of adsorption to a particular sized heteroatom compound. Using the adsorbents disclosed herein, a person skilled in the art could select the functional groups of the metal complex in the adsorbent (for $OR^2$ and $OR^3$) based on the properties of the alcohols and polyols and the particular interactions said alcohol, polyol or other functional groups may impart on the heteroatoms present in the hydrocarbon feed. In some embodiments, a mixture of multiple different adsorbents 112 or activated adsorbents may be present in vessel 110 in order to modulate the selectively and/or high affinity for the heteroatoms and heteroatom classes present in the hydrocarbon feed being treated by system 100.

In some embodiments, the metal complex of the adsorbent may be capable of binding sulfur or nitrogen containing heterocycle compounds mixed with the hydrocarbon fluid. A heterocycle may refer to cyclic compounds having a closed chain or ring of atoms, wherein one of the atoms in the chain or ring is not a carbon atom, but rather a heteroatom such as nitrogen, sulfur, iron, oxygen, vanadium, etc. This adsorbing property of the metal complex and activated adsorbent, in particular titanyl, zirconyl and hafnyl metal complexes may arise due to the nature of the alcohol, diol or polyol bonds with the titanium or other metal at the center of the metal complex. Examples of removable heterocycle compounds may include aziridine, azirine, thiirane, thiirene, diazirine, oxaziridine, azetidine, azete, thietane, thiete, diazetidine, dithietane, dithiete, pyrrolidiine, pyrrole, thiolane, thiophene, imidazolidine, imidazole, pyrazole, pyrazolidine, oxazolidine, oxazole, isooxazolidine, isoxazole, thizolidine, thiazole, isothiazolidine, isothiazole, dithiolane, triazoles, furan, oxadiazole, thiadiazole, dithiazole, tetrazole, piperdine, pyridine, thiane, thiopyran, piperazine, diazones, morpholine, oxazine, dithiane, dithiine, triazone, trithiane, tetrazine, azepane, azepine, thiepane, thiepine, homopiperazine, diazepine, thiazepine, azocane, azocine, and combinations of heterocyles thereof.

Referring back to FIG. 1, the system 100 used for reducing the heteroatom content of a hydrocarbon feed, may further include an inlet 107 receiving a conduit 105. In some embodiments, the conduit 105 may be connected to a source or reservoir of a hydroperoxide or a peracid which may be used for activating the adsorbent 112 located inside vessel 110. In some embodiments, the source of the hydroperoxide or peracid may be pumped through conduit 105 and enter vessel 110 via the first inlet 107. As the hydroperoxide or peracid is pumped into the vessel 110, the hydroperoxide or peracid may flow over the adsorbent 112 packed within the vessel 110, reacting with the adsorbent 112 to form an activated adsorbent described above. As the hydroperoxide or peracid passes through the vessel 110, the unused or remaining hydroperoxide or peracid may exit the vessel 110 via outlet 115.

Embodiments of system 100 may further comprise a conduit 101 which may be connected to inlet 103 of the vessel 110. In some embodiments, the conduit 101 may be connected to a source or reservoir of hydrocarbons and more specifically to a heteroatom containing hydrocarbon mixture. Similar to the hydroperoxide and peracid, the hydrocarbon/heteroatom mixture (hereinafter hydrocarbon feed) may be pumped through the conduit 101 and enter vessel 110 via the inlet 103. As the hydrocarbon feed enters the inlet 103, the hydrocarbon feed may flow over the adsorbent 112 or activated adsorbent, making contact with said adsorbent. When contact is made between the adsorbent 112 or activated adsorbent and the heteroatoms of the hydrocarbon feed, the heteroatoms present in the hydrocarbon feed may adsorb to the adsorbent 112 or activated adsorbent, removing and separating the heteroatom from the hydrocarbon feed as the hydrocarbon feed continues to flow through vessel 110, until the hydrocarbons exit via outlet 115 as effluent 113. The resulting effluent 113 exiting the outlet 115 may have a reduced heteroatom content compared to the hydrocarbon feed entering vessel 110 at the inlet 103.

Although the exemplary embodiment depicted in FIG. 1 depicts multiple conduits 101, 105 and multiple inlets 103, 107, an alternative embodiment may use a single shared conduit (not shown) and inlet to transport and deliver the hydrocarbon feed, hydroperoxide and/or peracid to the vessel 110, however the two feeds 101 and 105 are not fed simultaneously, but rather consecutively. The two steps may optionally be repeated as desired.

Figure 3:
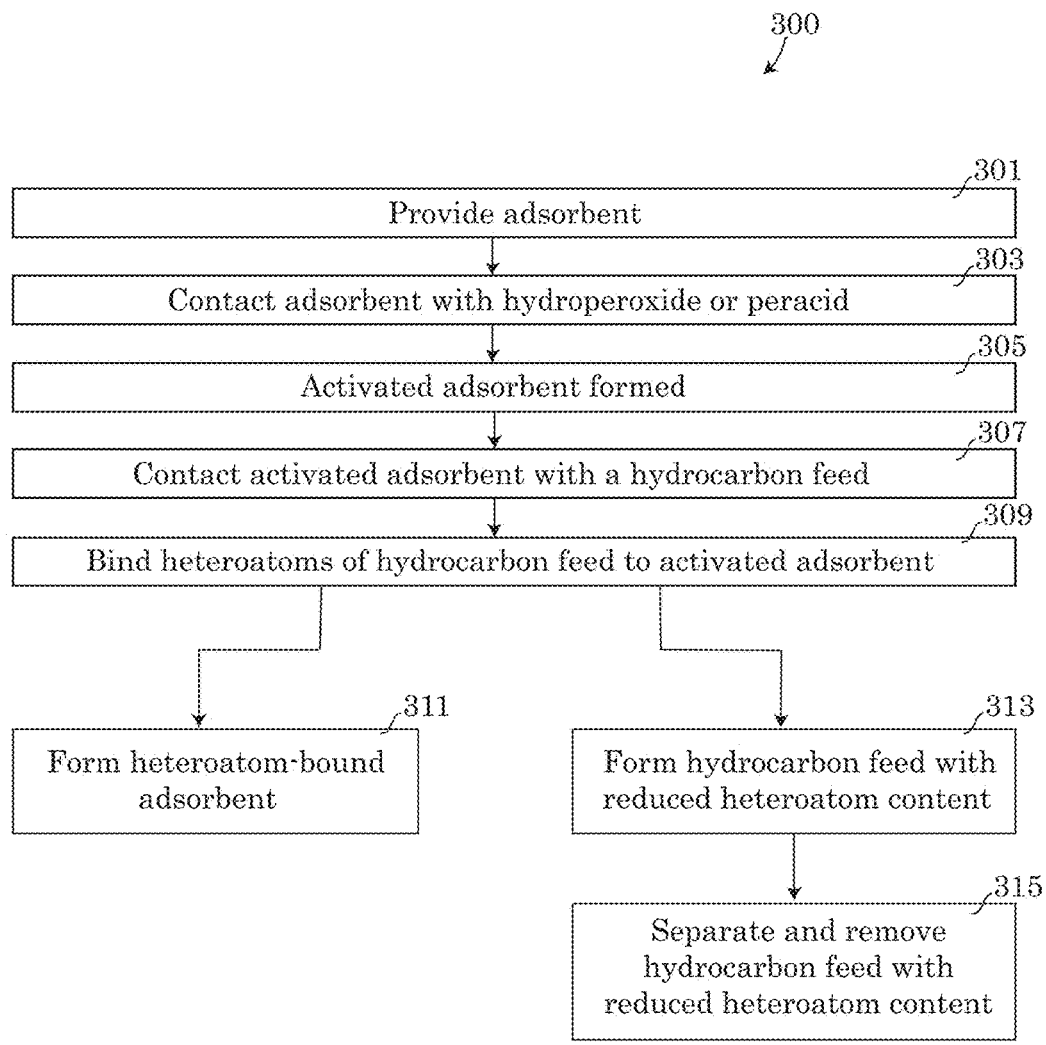
FIG. 3 depicts a flow chart describing an embodiment of a method for reducing the heteroatom content of a hydrocarbon feed.

FIG. 3 provides a flow chart describing an embodiment of a method 300 that may be performed using system 100 described above. In step 301 of method 300, the step of providing an adsorbent 112 may be performed by packing vessel 110 with adsorbent 112 by placing the adsorbent 112 inside vessel 110. In alternative embodiments, step 301 may be performed by purchasing or building vessel 110 with the adsorbent 112 pre-packed inside. In step 303, the adsorbent 112 provided in step 301 may be contacted with a hydroperoxide or peracid. The step of contacting the adsorbent 112 may be performed by introducing the hydroperoxide or peracid into vessel 110 via inlet 107 and flowing the hydroperoxide or peracid through the vessel 110 until it reaches outlet 115. Any remaining hydroperoxide and peracid may be ejected from vessel 110 through outlet 115. As the hydroperoxide or peracid flows through the vessel 110, the hydroperoxide or peracid may contact the adsorbent and activate the adsorbent, forming an activated adsorbent in step 305.

After the activated adsorbent is formed in step 305, a contacting step 307 may be performed by introducing a hydrocarbon feed containing a mixture of one or more heteroatoms therein, into vessel 110 via the second inlet 107. As the hydrocarbon feed is introduced into the vessel 110. The hydrocarbon feed may flow through vessel 110, creating contact between the activated adsorbent and the hydrocarbon feed having one or more heteroatoms present in the feed, which may include one or more heterocycles containing sulfur or nitrogen in some embodiments. As a result of the contacting step 307, in step 309 the heteroatoms present in the hydrocarbon feed passed through the vessel 110 may bind to the activated adsorbent.

The step of contacting the hydrocarbon feed with the adsorbent in step 307 may be performed at a sufficient temperature and for an ample amount of time for the heteroatoms present in the hydrocarbon feed to proceed with binding to the adsorbent in step 309. The temperature of the vessel 110 may be about 0° C. to about 100° C., and about 20° C. to about 50° C. in the exemplary embodiments described in the examples below. The residence time may vary from as little as about 30 seconds to about 90 minutes, while in the exemplary embodiments the residence time may be about 2 to about 15 minutes. The pressure may be about 0.1 atmospheres to about 10 atmospheres, however in the exemplary embodiments shown in the examples below, the contacting and binding steps may be performed at approximately atmospheric pressure.

As the hydrocarbon feed passes through the vessel 110, steps 311 and 315 may be performed simultaneously or nearly simultaneously. First, as the hydrocarbon feed passes through the vessel 110, the heteroatoms present in the hydrocarbon feed may bind to the activated adsorbent in step 309, forming a heteroatom-bound adsorbent in step 311. The heteroatom-bound adsorbent of step 311 may include nitrogen heterocycles and sulfur heterocycles bound to the activated adsorbent in some embodiments. The heteroatom-bound adsorbent formed in step 311 may remain behind inside the vessel 110 until removed.

As a result of the heteroatom binding of step 311, the hydrocarbons of the hydrocarbon feed may be released from the vessel 110 as effluent 113, exiting through outlet 115. As a result of the heteroatoms being bound to the activated adsorbent in step 311 and the release of the hydrocarbon feed having a reduced heteroatom content from the vessel, step 315 may be performed, wherein the hydrocarbon feed with the reduced heteroatom content is separated and removed from the heteroatom-bound adsorbent, thus ejecting a collectable hydrocarbon feed having a reduced heteroatom content, while the bound heteroatoms remain inside vessel 110.

In some embodiments method 300 may result in a reduced heteroatom content that is approximately 15% (or less) of the total heteroatom content of the hydrocarbon feed entering the vessel 110 via inlet 107. This drastic amount of heteroatom content reduction is demonstrated multiple times in the examples provided below. As shown in example 1 below, a hydrocarbon feed containing 104 ppm of sulfur was reduced to 13.5-15 ppm, in example 2 a hydrocarbon feed containing 988 ppm of sulfur was reduced to 123.2-300 ppm, and in example 3 a hydrocarbon feed containing 95 ppm sulfur was reduced to 12.3 ppm-20 ppm. However, the amount of heteroatom reduction may vary depending on the adsorbent 112 and activated adsorbent present in the vessel 110, and the temperature and residence time of the contacting step 307, which may be controlled by the flow rate of the hydrocarbon feed through the vessel 110. As the residence time increases, an increased amount of heteroatom reduction may be obtained. The reduced heteroatom content of the hydrocarbon feed may be less than 99%, less than 90%, less than 80%, less than 75%, less than 50%, less than 35%, less than 20%, less than 15%, less than 10%, or even less than 5% of the heteroatom content of the hydrocarbon entering inlet 107 of the vessel 110, in some embodiments. Likewise, the total heteroatom content of the hydrocarbon feed may be reduced by at least a 10%, at least a 20%, at least a 30%, at least a 50%, at least a 65%, at least a 75%, at least an 85%, at least 90% or at least 95%.

Figure 4:
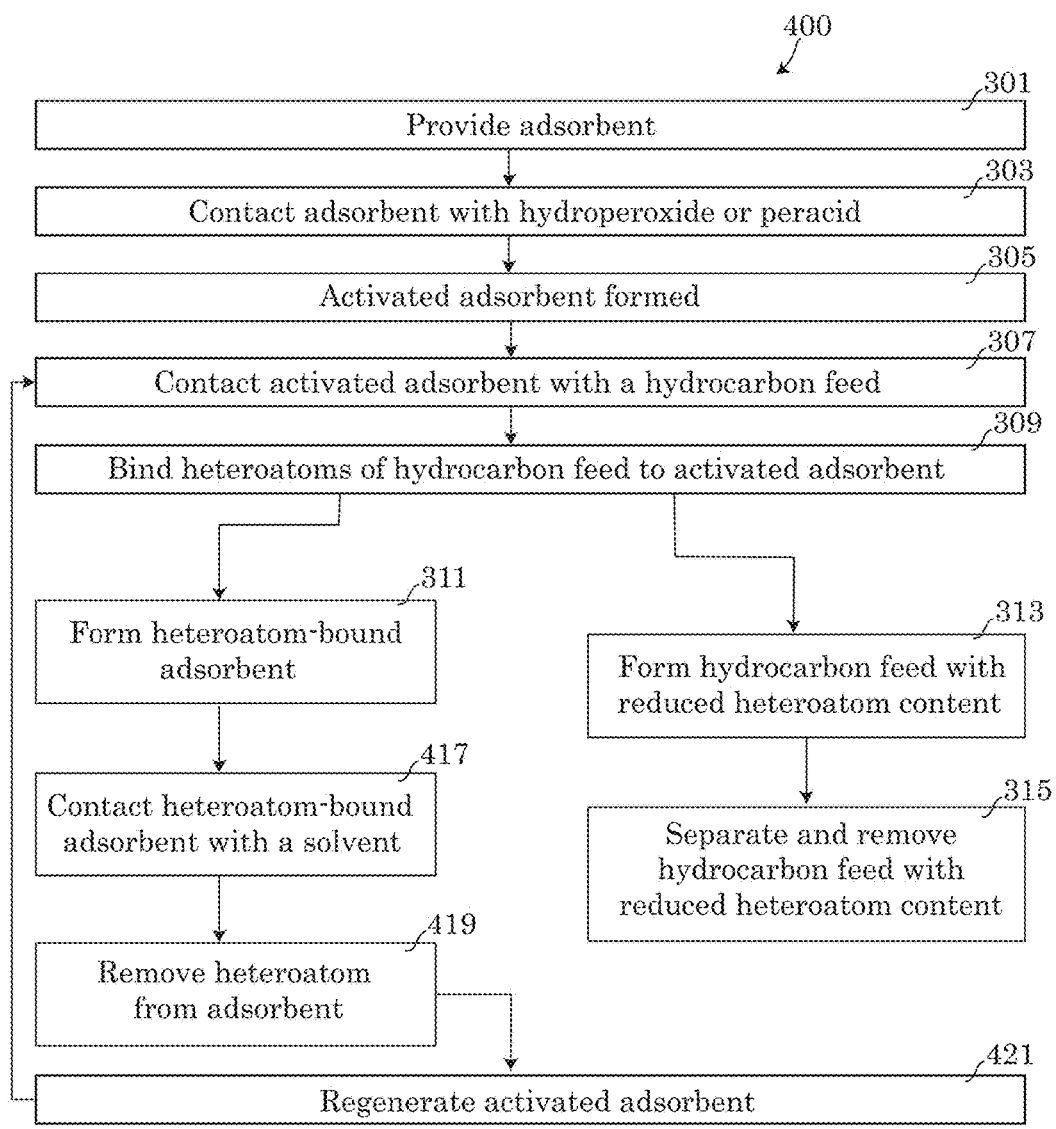
FIG. 4 depicts a flow chart describing an alternate embodiment of a method for reducing the heteroatom content of a hydrocarbon feed.
Figure 5:
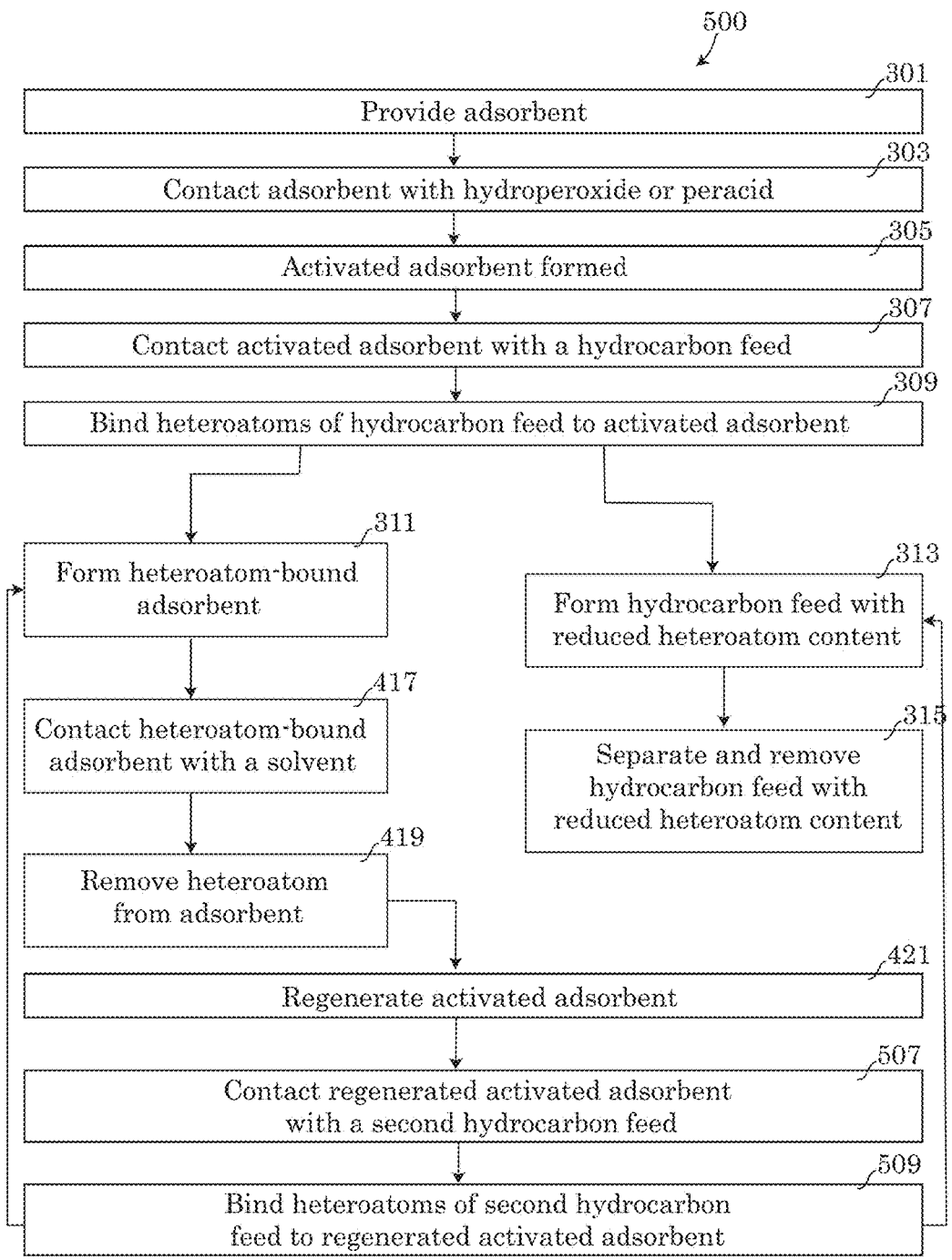
FIG. 5 depicts another alternative embodiment of a method for reducing the heteroatom content of a hydrocarbon feed.

In an alternative embodiment of method 300, method 400 may comprise one or more additional steps. As shown in FIG. 4, steps 301, 303, 305, 307, 309, 311, 313 and 315 may remain consistent with steps previously discussed above for method 300. However, additional step 417 may be performed comprising the addition step of contacting the heteroatom-bound adsorbent formed in step 311 with a solvent. The solvent may be any type of solvent capable of extracting the heteroatoms from the adsorbent and placing the heteroatom in solution in order to remove the heteroatom from the vessel 110 via outlet 115. Suitable solvents may include solvents with a Hansen Solubility polarity parameter ($\delta P$) preferably in the range of about 0 to 20, and more preferably in the range of about 1 to 16.

In some embodiments, the solvent may be the same as the hydroperoxide or peracid, or a mixture of a hydroperoxide or peracid previously discussed for activating the adsorbent 112 with another solvent. In some embodiments, the solvent may be provided to the vessel 110 via conduit 105 and enter the vessel 110 through the inlet 107. As the solvent flows through the heteroatom-bound adsorbent, the solvent may extract the heteroatom from the activated adsorbent, flushing the heteroatoms from the activated adsorbent. As a result, the heteroatom previously bound to the activated adsorbent may be removed from the adsorbent in step 419, leaving behind the activated adsorbent as a regenerated activated adsorbent in step 421. As the solvent flows through the vessel 110, extracting the heteroatom from the activated adsorbent, and placing the heteroatom in the solvent, the heteroatom may be removed from the vessel 110 as the solvent exits the vessel 110 via the outlet 115. Accordingly, in some embodiments, the regenerated activated adsorbent formed in step 421 may remain inside the vessel 110 and may be subsequently used over and over again as part of method 300 or 400 previously described.

In an alternative embodiment, methods for regenerating a heteroatom-bound adsorbent bed may include diverting the hydrocarbon feed to a fresh adsorbent bed filled with activated adsorbent, while the first bed containing the heteroatom-bound adsorbent is regenerated and the heteroatoms flushed from the adsorbent bed using a liquid or gas solvent for a time and at a temperature suitable to desorb the heteroatom compounds from the adsorbent bed in accordance with steps 417, 419 and 421, placing the regenerated activated adsorbent in a condition suited for reuse. In this way, a continuous stream of the hydrocarbon feed may be subjected to continuous heteroatom removal, without having to stop the hydrocarbon feed in order to perform heteroatom removal of the heteroatom-bound adsorbent and regeneration steps, reducing and eliminating heteroatom removal downtime of the disclosed method steps.

In an alternative embodiment, method 500, the regenerated activated adsorbent formed in step 421 of method 400, may be used for further repeatedly reducing the heteroatom content of the hydrocarbon feed or a second hydrocarbon feed. Similar to methods 300 and 400 described above, the second hydrocarbon feed (or previously treated hydrocarbon feed having a reduced heteroatom content) may be pumped through conduit 101 into inlet 103. As the second hydrocarbon feed enters the vessel 110, and flows through the vessel 110, the second hydrocarbon feed may perform step 507, contacting the regenerated activated adsorbent with the second hydrocarbon feed. Similar to step 307, the contacting step 507 may result in the heteroatoms of the second hydrocarbon feed binding to the regenerated activated adsorbent in step 509.

In some embodiments performing step 509, method 500 may subsequently proceed to form a heteroatom-bound adsorbent consistent with step 311 discussed above and produce a hydrocarbon feed effluent 113 having a reduced heteroatom content that is less than the heteroatom content of the second hydrocarbon feed introduced in step 507. The reduced heteroatom containing hydrocarbon feed resulting from the second hydrocarbon feed may be separated and removed from the vessel 110 in a manner consistent with step 315 described above. Likewise, the heteroatom-bound adsorbent formed as a result of step 509 may be regenerated in manner consistent with steps 417, 419 and 421 described above.

Figure 2:
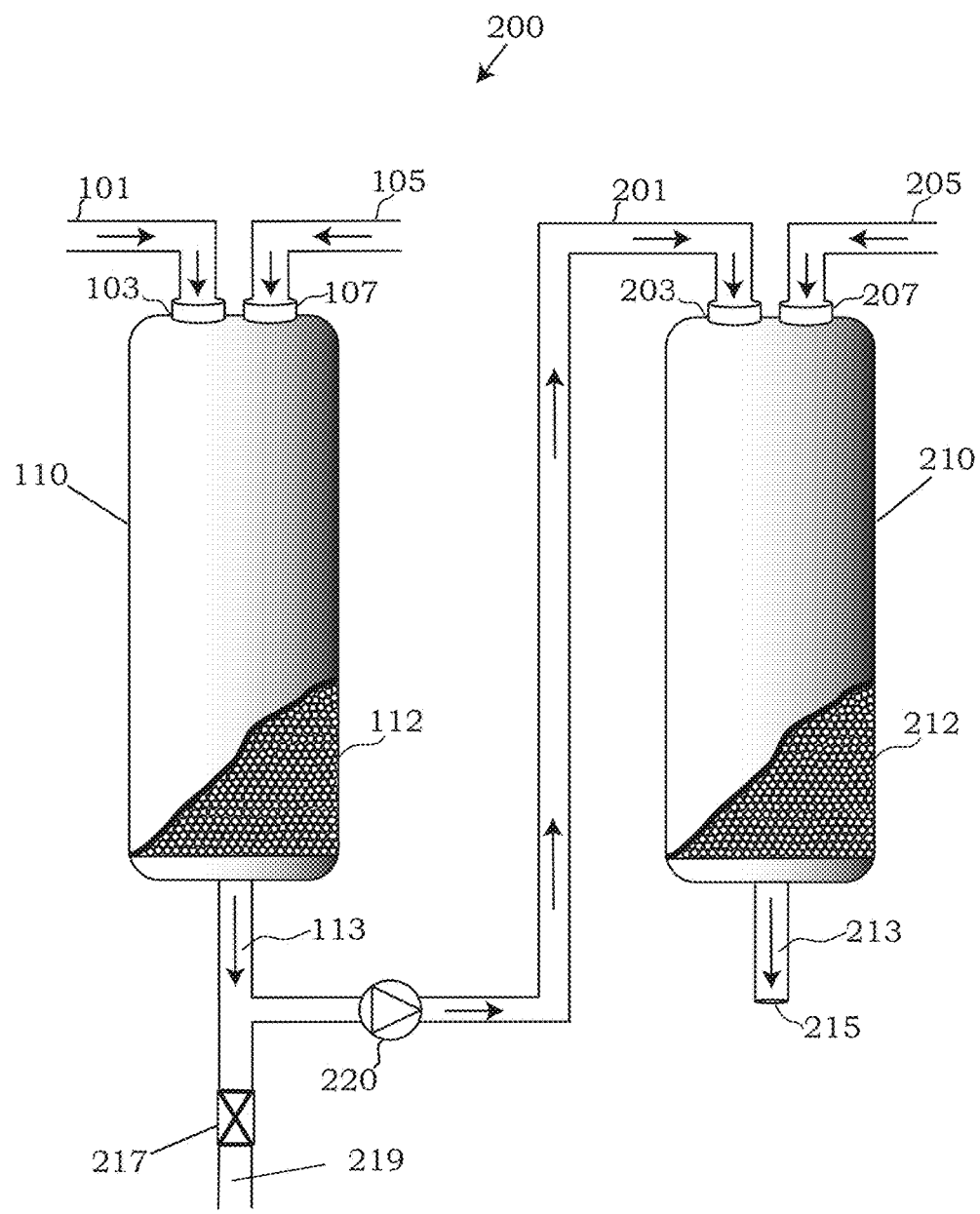
FIG. 2 depicts a partially exposed view of an alternative embodiment of a system for reducing the heteroatom content of a hydrocarbon feed.

In an alternative system 200 depicted in FIG. 2, the system 200 may include a plurality of vessels 110, 210 linked together in series with one another. Linking vessel 110 with vessel 210 via conduit 201 may provide an opportunity for further heteroatom removal of the hydrocarbon feed released as effluent 113, having a reduced heteroatom content from the system 100 shown in FIG. 1. In system 200, the hydrocarbon having a reduced heteroatom content being released from vessel 110 may be pumped via pump 220 to an inlet 203 of vessel 210.

Vessel 210 may be the same type of vessel as previously described above for vessel 110. Moreover, similar to the embodiments of vessel 110, vessel 210 may further include an adsorbent 212 packed within the vessel 210. The adsorbent 212 may be any type of adsorbent previously described above for adsorbent 112, including any and all activated adsorbents previously discussed. Embodiments of the adsorbent 112 and adsorbent 212 may be identical to one another within system 200, however in some embodiments, the adsorbents 112, 212 may differ between vessels 110 and 210. Selection of different adsorbents 112, 212 within vessel 110, 210 may be useful for binding different types of heteroatoms. For example, a user of system 200 may target a specific type of heteroatom in the first vessel 110 and subsequently seek to remove a second type of heteroatom in the second vessel 210. For instance, in some embodiments, the adsorbent 112 selected in vessel 110 may have a higher affinity for sulfur containing heterocycles whereas the adsorbent 212 selected in vessel 210 may have a higher affinity for nitrogen containing heterocycles (or vice versa).

Embodiments of the adsorbent 212 may also be activated in a manner similar to the adsorbents present in vessel 110. For example, in some embodiments, a hydroperoxide or peracid may be introduced into the second vessel 210 via a conduit 205 and inlet 207. Similar to the adsorbent in vessel 210, the hydroperoxide or peracid flowing through the vessel 210 may activate the adsorbent in the manner described above and any excess hydroperoxide or peracid may be ejected via outlet 215.

The hydrocarbon effluent 113 being pumped through conduit 201 may enter vessel 210 and pass through vessel 210, making contact with the activated adsorbent as the effluent hydrocarbon feed from vessel 110 passes through vessel 210. As the effluent hydrocarbon feed passes through the vessel 210, the residual heteroatoms that were not bound the activated adsorbent in vessel 110, may be subsequently bound to the activated adsorbent of vessel 210, forming a heteroatom-bound adsorbent, similar to the manner previously described for system 100. The hydrocarbon feed entering via inlet 203 may exit vessel 210 as effluent 213. The effluent 213 may subsequently have a reduced heteroatom content that is less than both the heteroatom content of effluent 113 and the hydrocarbon feed that entered vessel 110 through inlet 101.

Simultaneously, or near simultaneously as effluent 113 is being pumped to vessel 210, in some embodiments, the regeneration of the heteroatom-bound adsorbent of vessel 110 may be regenerated in accordance with the methods 400 and 500 discussed above. However, in system 200, as the solvent having the dissolved heteroatoms exits outlet 115, the solvent and heteroatoms may be purged from system 200 via purge valve 217 as either waste 219 or sent to another process for recycling of the solvent which may be returned to system 200 to activate the adsorbent 112, 212 or dissolve heteroatom-bound adsorbents of vessel 110 or vessel 210.

Figure 6:
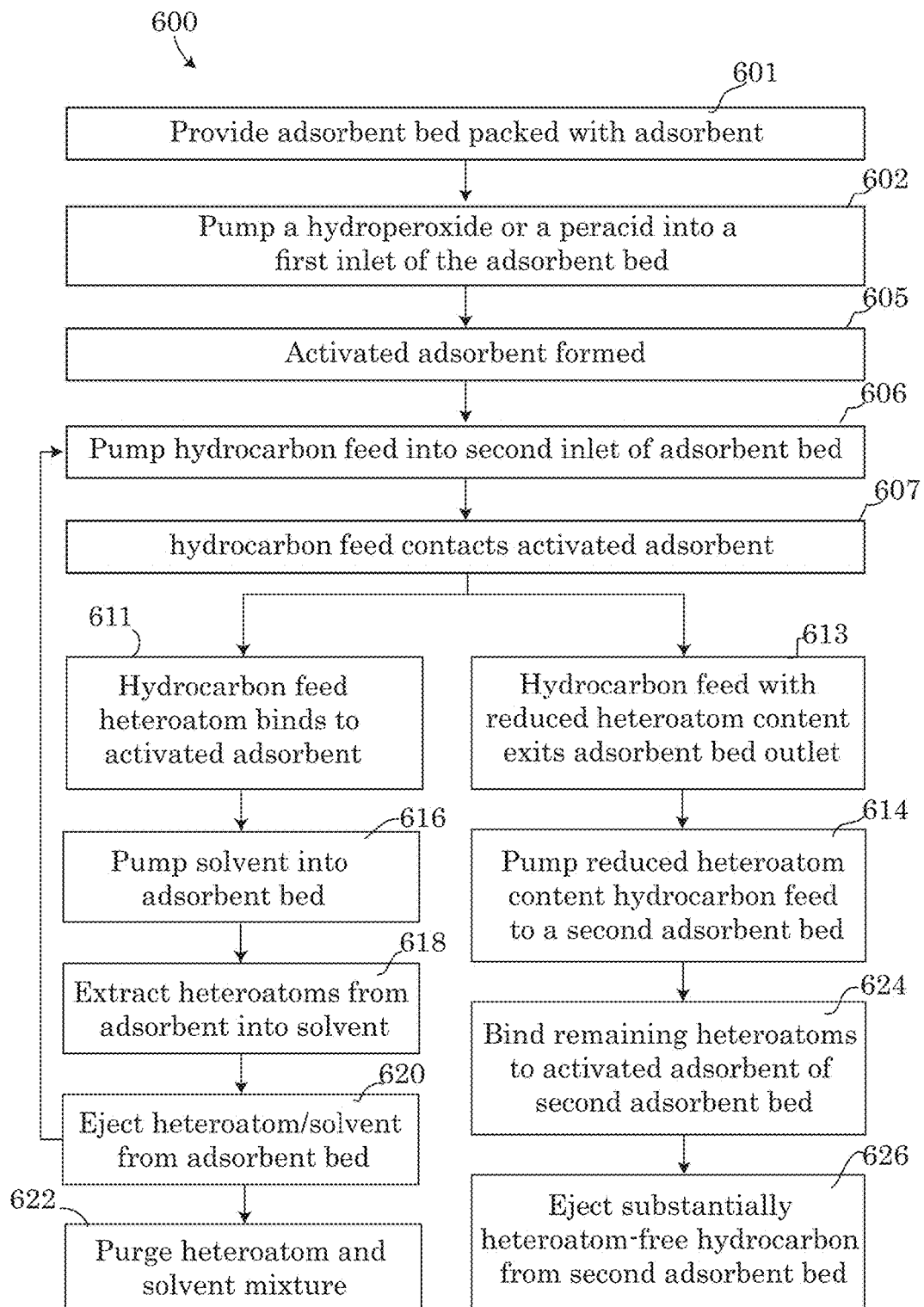
FIG. 6 depicts a flow chart of an alternative embodiment of a method for reducing the heteroatom content of a hydrocarbon feed using a plurality of adsorbent beds in an adsorbent bed system.

FIG. 6 of the present disclosure further describes the method steps for adsorption, removal and regeneration steps of system 200. Using the embodiment 600 as an example, in step 601, each of the vessels 110 and 210 may be packed with adsorbent 112, 212 or purchased pre-packed with the adsorbent of choice. In step 602, a hydroperoxide or peracid may be pumped into vessel 110 via conduit 105, activating an adsorbent bed containing the adsorbent 112, 212 in step 605.

In step 606, a hydrocarbon feed may be pumped through conduit 101 into inlet 103 of the vessel 110. As the hydrocarbon feed flows through vessel 110, the hydrocarbon feed may contact in step 607, the activated adsorbent present in vessel 110 as a result of step 605. As a result of step 607, in step 613, a hydrocarbon feed with a reduced heteroatom content may exit the adsorbent bed of vessel 110 as effluent 113, leaving behind the heteroatoms bound to the activated adsorbent in step 611. In step 614 of method 600, pump 220 may pump the reduced heteroatom containing hydrocarbon as effluent 113 to the second adsorbent bed 210 via conduit 201.

In step 624 of the method 600, the effluent 113 may pass through vessel 210 and bind the remaining heteroatoms present in effluent 113 to the activated adsorbent of vessel 210, resulting in the formation of heteroatom-bound adsorbent inside vessel 210. In step 626, the effluent hydrocarbon 213 may be ejected from the second vessel 210 having a reduced heteroatom content or as a heteroatom-free hydrocarbon. The hydrocarbon effluent 213 may be sent for further processing or heteroatom removal downstream as needed.

As the effluent 113 is being pumped to the second adsorbent bed of vessel 210, the heteroatoms bound to the adsorbent bed of vessel 110 may be removed. Starting in step 616, the solvent may be pumped into vessel 110 via conduit 105. The solvent may enter the vessel 110 and in step 618, the heteroatoms bound to the adsorbent of vessel 110 may be extracted from the adsorbent and mixed into the solvent passing through the vessel 110. In step 620, the solvent containing the heteroatoms removed from the adsorbent may be ejected from the adsorbent bed of vessel 210 and purged via purge vale 217 in step 622 as waste or for further recycling.

The following working examples are provided for illustrative purposes. The working examples are intended to be non-limiting and are intended to further explain and assist in clarifying one or more of the elements of the embodiments described above in the current disclosure:

EXAMPLE 1

Removal of Sulfur from Kerosene to Produce Ultra-low Sulfur Diesel

A packed bed was prepared containing an adsorbent having a bis(glycerolato)oxotitanium(IV) coated onto silica (4.1 grams), which had been previously contacted with tert-butyl hydroperoxide in toluene. The void volume in the bed was found to be 5.8 mL. A kerosene feed with 104 ppm sulfur was flowed through at room temperature and atmospheric pressure, with a residence time of 5 minutes. The first bed volume contained 13.5 ppm sulfur, and 12.2 bed volumes of kerosene exited the bed with less than 15 ppm sulfur. Pentane was flowed over the bed to remove any residual kerosene (about 5 bed volumes). 3 bed volumes of a 10 wt. % solution of tert-butyl hydroperoxide in toluene was flowed over the adsorbent and collected. Another 3 bed volumes of pentane was flowed over the bed to remove any residual hydroperoxide, then air was blown through the bed to thoroughly dry the pentane off. A second pass of 104 ppm sulfur-containing kerosene was flowed over the same bed of adsorbent at 20° C. and atmospheric pressure. The first bed volume contained 4.1 ppm sulfur, and a total of 19.7 bed volumes exited the column with a sulfur content less than 15 ppm.

EXAMPLE 2

Removal of Sulfur from a Heavy White Oil

An experiment was performed identically to Example 1, except that a heavy white oil feed with 988 ppm sulfur was flowed through a similarly prepared packed bed of adsorbent. The first bed volume contained 123.2 ppm sulfur, and approximately 4 bed volumes of white oil exited the bed with sulfur below 300 ppm. Pentane was flowed over the bed to remove any residual kerosene (about 5 bed volumes). 110 ml of 10 wt. % solution of tert-butyl hydroperoxide in toluene was flowed over the adsorbent and collected. Another 3 bed volumes of pentane was flowed over the bed to remove any residual hydroperoxide, then air was blown through the bed to thoroughly dry the pentane off. A second pass of 988 ppm sulfur-containing heavy white oil was flowed over the same bed of adsorbent at 20° C. and atmospheric pressure. The first bed volume contained 23.8 ppm sulfur, and a total of about 5 bed volumes exited the column with a sulfur content less than 100 ppm.

EXAMPLE 3

Removal of Sulfur from Dicyclopentadiene (DCPD) to Produce Ultra-low Sulfur Dicyclopentadiene DCPD is a reactive feed that would decompose if heated or contacted with hydroperoxides. A packed bed was prepared containing an adsorbent consisting of bis(glycerolato) oxotitanium(IV) coated onto silica (4.1 grams), which had been previously contacted with tert-butyl hydroperoxide in toluene. The void volume in the bed was found to be 5.0 mL. A DCPD feed with 95 ppm sulfur was flowed through at room temperature and atmospheric pressure, with a residence time of 5 minutes. The first bed volume had 12.3 ppm sulfur, and 8 bed volumes of DCPD exited the bed with less than 20 ppm sulfur. Pentane was flowed over the bed to remove any residual DCPD (about 3 bed volumes). 20 bed volumes of a 10 wt. % solution of tert-butyl hydroperoxide in toluene was flowed over the adsorbent and collected. Another 6 bed volumes of pentane was flowed over the bed to remove any residual hydroperoxide, then air was blown through the bed to thoroughly dry the pentane off. A second pass of 95 ppm sulfur-containing DCPD was flowed over the same bed of adsorbent at room temperature and atmospheric pressure. The first bed volume contained 14.1 ppm sulfur, and a total of 9 bed volumes exited the column with a sulfur content less than 20 ppm. An analysis of the material after sulfur removal showed that the composition was unchanged, except for the reduced sulfur content, and that no undesired chemical reactions had occurred.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method for reducing a heteroatom content of a hydrocarbon feed comprising the steps of:
    providing an adsorbent having a metal complex bound to an inorganic oxide support, wherein the metal complex is a titanyl having a titanium molecule covalently bonded to an alcohol or polyol;
    contacting the adsorbent with a hydroperoxide or a peracid, forming an activated adsorbent;

contacting the activated adsorbent with the hydrocarbon feed;

binding a heteroatom present in the hydrocarbon feed to the activated adsorbent, forming a heteroatom-bound adsorbent, leaving behind a hydrocarbon feed having a reduced heteroatom content; and separating the hydrocarbon feed having the reduced heteroatom content from the heteroatom-bound adsorbent.

2. The method of claim 1, further comprising the step:

contacting the heteroatom bound adsorbent with a solvent, the solvent removing the heteroatom from the heteroatom-bound adsorbent, forming a regenerated activated adsorbent.

3. The method of claim 2, wherein the solvent is a hydroperoxide or peracid.

4. The method of claim 2, further comprising the step of:

separating the heteroatom dissolved in the solvent from the regenerated activated adsorbent.

5. The method of claim 2, further comprising the steps of:

contacting the regenerated activated adsorbent with a second hydrocarbon feed; and binding a heteroatom of the second hydrocarbon feed to the regenerated activated adsorbent.

6. The method of claim 1, wherein the metal complex is selected from the group consisting of bis(glycerolato)oxotitanium(IV), bis(sorbitolato)oxotitanium(iv), bis(erythritolato)oxotitanium (IV), bis(mannitolato)oxotitanium(IV) and combinations thereof.

7. The method of claim 1, wherein hydroperoxide or peracid is selected from the group consisting of hydrogen peroxide, tert-butyl hydroperoxide, ethylbenzene hydroperoxide, cumyl hydroperoxide, tetrahydronaphthalene hydroperoxide, performic acid, peracetic acid and combinations thereof.

8. The method of claim 1, wherein the metal complex of the activated adsorbent is bis(polyol)(tert-butyl hydroperoxo)oxotitanium(IV), bis(polyol)(ethylbenzene hydroperoxo)oxotitanium(IV), bis(polyol)(cumyl hydroperoxo)oxotitanium(IV) or bis(polyol)(tetrahydronaphthalene hydroperoxo)oxotitanium(IV).

9. The method of claim 1, wherein heteroatom content of the hydrocarbon feed is reduced by at least 85%.

* * * * *